United States Patent [19]

Sing

[11] 3,968,256

[45] July 6, 1976

[54] PREPARATION OF COTTAGE CHEESE

[76] Inventor: Edmond L. Sing, 3860 Cheviot Place, Indianapolis, Ind. 46226

[22] Filed: July 2, 1973

[21] Appl. No.: 375,329

Related U.S. Application Data

[63] Continuation of Ser. No. 109,697, Jan. 25, 1971, abandoned.

[52] U.S. Cl. .................................. 426/38; 426/36; 426/43; 426/61; 195/96
[51] Int. Cl.² .................. A23C 19/02; A23C 19/10
[58] Field of Search ............... 426/37, 38, 43, 61; 195/96; 109/697

[56] References Cited
UNITED STATES PATENTS

| 3,323,921 | 6/1967 | Moseley | 426/61 X |
| 3,395,081 | 7/1968 | Sherman et al. | 426/61 X |
| 3,420,742 | 1/1969 | Farr | 426/61 X |
| 3,592,740 | 7/1971 | Christenson | 195/96 |

OTHER PUBLICATIONS

Cowman, et al., Activity of Lactic Streptococci Follwng Ultra Low-Temperature Storage J. Dairy Science vol. 46, 1963 (p. 609).

*Primary Examiner*—David M. Naff
*Attorney, Agent, or Firm*—Woodard, Weikart Emhardt & Naughton

[57] ABSTRACT

Flavor and shelf life of cottage cheese are improved by adding to cottage cheese or a creaming mixture for creaming cottage cheese a concentrated cell preparation of *Streptococcus diacetilactis* to provide a concentration of cells in the cottage cheese of from $1.0 \times 10^6$ cells per gram to $2.0 \times 10^8$ cells per gram of cottage cheese. The concentrated cell preparation can be a freeze dried culture, frozen concentrated cells or freeze dried concentrated cells.

11 Claims, No Drawings

PREPARATION OF COTTAGE CHEESE

This is a continuation of application Ser. No. 109,697, filed Jan. 25, 1971, now abandoned.

BACKGROUND OF THE INVENTION

1. Field of the Invention

This invention relates to bacterial additives to dairy products and a method of preparing and using the additives.

2. Description of the Prior Art

Various bacteria, including *S. diacetilactis*, have been known to be used in adding diacetyl to dairy products and in inhibiting the growth of spoilage organisms in dairy products. Some patents relating to such processes are:

| | | |
|---|---|---|
| 2,586,072 | Marcoux | 1952 |
| 2,971,847 | Babel | 1961 |
| 3,048,490 | Lundstedt | 1962 |
| 3,323,921 | Moseley | 1967 |

Patents relating to methods of improving flavor of dairy products using *S. diacetilactis* have been known since 1952 and yet only a very small percentage of dairy products are produced which take advantage of these methods of adding flavor and improving the keeping quality of dairy products. Those dairies that are utilizing patented procedures using other organisms require one to two days time in preparation of the culture additive to be used in dairy products. One of the problems existing in the Lundstedt procedure is that it concerns increasing flavor primarily and not extension of shelf life. Another problem noted in Moseley is the critical time necessary for controlling the incubation period to produce the desirable flavor. Due to the difficulty of controlling temperature and time of incubation, levels of innoculation, rate of cooling and other factors, it is hard to avoid a high production of acetaldehyde which causes an objectionable "green" flavor in the final product. Special culturing equipment in this procedure may also be required.

Many problems normally arise whenever bacteria are used. Each dairy must have trained personnel who are familar with culture handling techniques. These techniques may be such things as determining activity of starter culture, checking for bacterial contamination and for bacterial inhibitors such as antibiotics and bacteriophage. Other aspects with which this person should be familar are selection and preparation of starter medium, culture inoculation levels, determination when a culture is ripened and flavor judgment of the ripened culture to provide an optimum level of acid and aroma producing products such as diacetyl. Each dairy should also have isolated culturing facilities for propagating select strains of cultures used in the dairy industry. Using *S. diacetilactis*, numerous conditions must be carefully controlled to insure that excess lactic acid and other non-desirable flavor compounds are not produced.

SUMMARY OF THE INVENTION

A method for improving dairy products which comprises adding to the dairy product a culture preparation of *Streptococcus diacetilactis* containing over $3 \times 10^9$ cells per gram to cause a concentration of cells in the dairy product of from $1.0 \times 10^6$ cells per gram to $2 \times 10^8$ cells per gram.

Three types of culture preparations are suggested for use in this invention, any one of which distinctly improves the prior art methods.

The three types are a freeze dried culture, frozen concentrated cells, and freeze dried concentrated cells. The concentrated types offer particular advantages in several respects. First, they are extremely high in cell count per given volume; second, they are free of deleterious waste products; and, third, they can be added conveniently to the finished product. The two concentrated types eliminate objectionable soluble cell waste products such as lactic acid and acetaldehyde produced during the growth of the cells.

No homogenization steps are needed, concentrate is merely added with simple mixing to distribute. No extensive storage facilities are needed for cottage cheese dressing containing cultured additive. The storage facilities normally used for dressing are all that is necessary using the improved procedure. Since addition of concentrate provides preservative properties to the final product, it will also impart this advantage to dressing alone. Another advantage is that large quantities of dressing may be processed and concentrate added for use over several days.

Since any of the three suggested culture preparations may be stored for long periods of time under proper conditions and may be standardized to specific concentrations, many problems of the prior art are eliminated. Dispensing and predicting flavor and shelf life becomes an elementary task. There is no longer any need to use the time of skilled people or elaborate specialized equipment at the place of manufacture of the dairy products. Small dairies will be able to use the process successfully by purchasing concentrates from other companies.

The concentrates may be made economically in very large quantities with high quality control since they will keep for long periods of time and, in cases of freeze dried concentrate, will sustain a short period of exposure to ambient temperatures. They are also light in weight which will facilitate shipment to dairies. While the three types of culture preparations must be kept at or below $-10°$ F. for the cells to maintain maximum viability; the freeze dried preparations can be subjected to ambient temperatures for shipping without refrigeration. In the prior art at least some portion of the finished product had to be incubated at above storage temperatures for many hours to obtain the desired flavor intensity and cell concentration. The use of the concentrates eliminates the necessity for an incubation period.

An individual dairy needs no incubation facilities whatsoever for *S. diacetilactis*. By simple addition of the concentrated cell preparation, which will typically contain from $5 \times 10^{10}$ to $3 \times 10^{11}$ cells per gram, to the previously cooled final product, the desired effects of added flavor and increased shelf life will be administered. In the final product, the concentration of cells desired will range from $1.0 \times 10^6$ cells per gram to $2 \times 10^8$ cells per gram.

DESCRIPTION OF THE PREFERRED EMBODIMENT

A method drawn in part from the teachings of Moseley is the preferred embodiment. Basically, the bacteria are grown in a skim milk base substrate until a high concentration of organisms is obtained. The bacteria are selected and grown in an effort to produce inhibitory activity against spoilage organisms and to provide desirable flavor characteristics. The bacteria are then centrifuged to concentrate the cells and to separate them from the undesirable by-products in the supernatant including lactic acid and acetaldehyde. The growth substrate has a small amount of suspended solid material and is relatively clear. When cell growth occurs, the turbidity of the substrate will become increasingly dense. This turbidity is a result of cell production. At the end of the fermentation period, the substrate is centrifuged and the resultant paste material harvested will consist mainly of cells. The effluent from the centrifugation process consists of undesirable products such as lactic acid and acetaldehyde, which therefore, are not added in significant quantities to the dairy products.

Frozen concentrated cells are standardized to a known concentration by adding phosphate buffered diluent to the harvested paste obtained from the centrifugation process. The final preparation is adjusted to an optimum pH of 6.6 – 6.8 and a standard cell concentration value by varying the ratio of paste to buffered diluent. The final step is quick freezing of this mixture in sealed containers in an acetone-dry ice bath.

Strict sanitary precautions are practiced to insure the concentrate to be a pure culture, free of contaminants. Quality control checks are made to maintain consistent activity and cell concentration. Maximum viability is preserved by storing at temperatures below −10°F. until desired for use.

Freeze dried concentrated cells are prepared in a similar manner to frozen concentrated cells. The final preparation to be freeze dried is made by blending a buffered diluent with the harvested paste obtained from the centrifugation process. In similar fashion the final preparation is adjusted to an optimum pH and to a standard cell concentration. This preparation is then freeze dried using conventional freeze drying techniques. The freeze dried powder is stored at a temperature below −10°F. to maintain maximum viability of cells. The freeze dried preparation, unlike frozen liquids, can be subjected to ambient temperature for short periods of time. The powder, for instance, can be shipped without refrigeration. However, upon arrival at its destination, storage again should be at a temperature below −10°F. to preserve viability.

The concentrates are added directly to the cottage cheese creaming mixture at refrigeration temperatures without further incubation of the product. The cells will be viable in the dairy product. These cells will also be metabolically active and, depending upon the storage temperature of the product, will grow at various rates depending on refrigeration temperature. The production of the desirable flavor (diacetyl) will depend upon the strain of $S.$ $diacetilactis$ used, the rate of metabolic activity and also upon the growth of the cells in the dairy product. Since refrigeration temperatures are not the optimum temperatures for rapid growth of these organisms, the increase in number of cells is extremely slow. Depending upon the level of flavor desired and the extension or period of shelf life, the inoculum is so regulated that the number of cells desired per gram of product can be closely controlled.

All concentrates suggested for use with this invention have cell counts ranging from $5 \times 10^{10}$ to $3 \times 10^{11}$ cells/gram which is greater than any unconcentrated culture. The term "culture preparation" as used herein is used to describe a product containing a very high bacterial cell count (per unit weight) and which has been processed to cause the cell count to be above the cell count in the media in which the bacteria were grown. Typically a conventional freeze dried culture has over $3 \times 10^9$ cells per gram. Frozen concentrated cells and freeze dried concentrated cells have a concentration of $5 \times 10^{10}$ to $3 \times 10^{11}$ cells per gram.

Other methods of producing culture preparations are known such as filtering, reverse osmosis, etc.

A concentration of at least $1.0 \times 10^6$ should be obtained in the final product in order for the inhibitory characteristics of $S.$ $diacetilactis$ to be effective. These inhibitory characteristics prevent the rapid growth of spoilage organisms and thus improve the keeping qualities of dairy products. At concentrations above $1.5 \times 10^8$, the flavor produced is generally stronger than is desired in dairy products.

The novel processes of this invention are more fully illustrated by the following specific examples:

EXAMPLE 1

Pasteurized non-fat milk is cooled to about 72°F. and then inoculated with a sufficient amount of an active culture of $S.$ $diacetilactis$ (A.T.C.C. No. 15346) to provide a luxurious growth after 16 hours of incubation at this temperature. The culture is then freeze dried and analyzed to determine cell concentration. The freeze dried culture is then added to a creaming mixture at about 38°F. Sufficient culture is added to the creaming mixture to produce a cell count in the cottage cheese of about $5 \times 10^7$ cells per gram. The finished cottage cheese has increased aroma of diacetyl and has a shelf life of 3½ weeks. The same result will be achieved if the culture preparation is added to the creamed cottage cheese rather than to the creaming mixture.

EXAMPLE 2

Heat treated milk substrate medium is cooled to about 85°F. and then inoculated with an active culture of $S.$ $diacetilactis$ A.T.C.C. No. 15346 in sufficient amount to provide a luxurious growth after about 12 – 16 hours. The culture is then centrifuged to obtain a cell containing paste which is separated from the supernatant. The harvested paste is diluted with a phosphate buffered diluent to obtain an optimum pH of 6.6 – 6.8 and to standardize the preparation to a known cell concentration. The concentrated cell preparation is then frozen to a temperature below −10°F. and stored until desired for use. A sufficient quantity of frozen concentrated cells containing $1.5 \times 10^{11}$ cells per gram is added to the creaming mixture at 38°F. to produce a cell count in the cottage cheese of $2 \times 10^7$ cells per gram. A medium level of diacetyl is produced in the finished cottage cheese and the product is acceptable for consumption for a period of 1 month. The same result will be achieved if the culture preparation is added to the creamed cottage cheese rather than to the creaming mixture.

EXAMPLE 3

The harvested paste of Example 2 is diluted with a phosphate buffered dilution to obtain an optimum pH and to standardize the preparation to a known cell concentration. This preparation is then freeze dried using conventional freeze dried techniques. A sufficient quantity of freeze dried concentrate containing $3 \times 10^{11}$ cells per gram is added to the creaming mixture at 40°F. to obtain a cell count in the cottage cheese of $5 \times 10^7$ cells per gram. A low level of diacetyl is produced in the finished cottage cheese and the product is acceptable for consumption for a period of 3 weeks. The same result will be achieved if the culture preparation is added to the creamed cottage cheese rather than to the creaming mixture.

The invention claimed is:

1. A convenient method for improving flavor and keeping characteristics of cottage cheese which comprises:

adding to the cottage cheese, or its creaming mixture, sufficient culture preparation of *Streptococcus diacetilactis*, said culture preparation selected from the group consisting of freeze dried culture, frozen concentrated cells, and freeze dried concentrated cells, to cause a concentration of cells in the cottage cheese from $1.0 \times 10^6$ cells per gram to $2 \times 10^8$ cells per gram of cottage cheese.

2. The method of claim 1 which additionally comprises the step of:

keeping the resultant mixture of cottage cheese and *Streptococcus diacetilactis* cooled to prevent significant growth of bacteria.

3. The method of claim 2 in which the culture preparation is freeze dried concentrated cells.

4. The method of claim 2 in which the culture preparation is frozen concentrated cells.

5. The method of claim 2 in which the culture preparation is freeze dried culture.

6. A method for improving flavor and keeping characteristics of cottage cheese which comprises:

adding to the cottage cheese or its creaming mixture sufficient culture preparation of *Streptococcus diacetilactis*, said culture preparation containing over $3 \times 10^9$ cells per gram, to cause a concentration in the cottage cheese of from $1.0 \times 10^6$ cells per gram to $2 \times 10^8$ cells per gram of cottage cheese and, keeping resultant mixture of cottage cheese and *Streptococcus diacetilactis* cold to prevent significant growth of bacteria.

7. The method of claim 3 in which the freeze dried concentrated cells are of a standard concentration.

8. A method for improving flavor and keeping characteristics of cottage cheese which comprises:

adding to the cottage cheese sufficient freeze dried concentrated cells of *S. diacetilactis* to cause a concentration of cells of about 1 million to 200 million per gram of cottage cheese.

9. A method for improving flavor and keeping characteristics of cottage cheese which comprises:

adding to the cottage cheese sufficient frozen concentrated cells of *S. diacetilactis* to cause a concentration of cells of about 1 million to 200 million per gram of cottage cheese.

10. The method of claim 4 in which the frozen concentrated cells are of a standard concentration.

11. The method of claim 10 in which the standardized frozen concentrated cells are prepared by the additional steps of centrifuging a culture, removing the supernatant, adding a buffered diluent to the resulting paste to adjust the cell concentration to a standard concentration, and quick freezing the standardized cells to a temperature below $-10°F$.

* * * * *